No. 844,214. PATENTED FEB. 12, 1907.
J. TILLY.
DRAFT GEAR FOR AGRICULTURAL MACHINES.
APPLICATION FILED SEPT. 8, 1906.
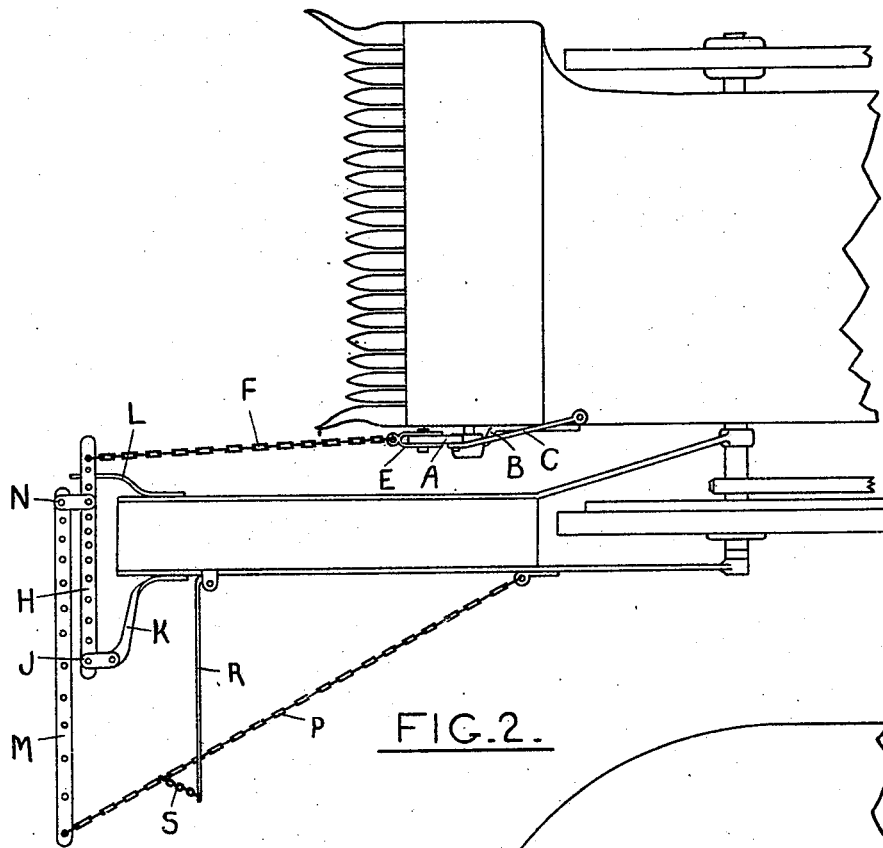
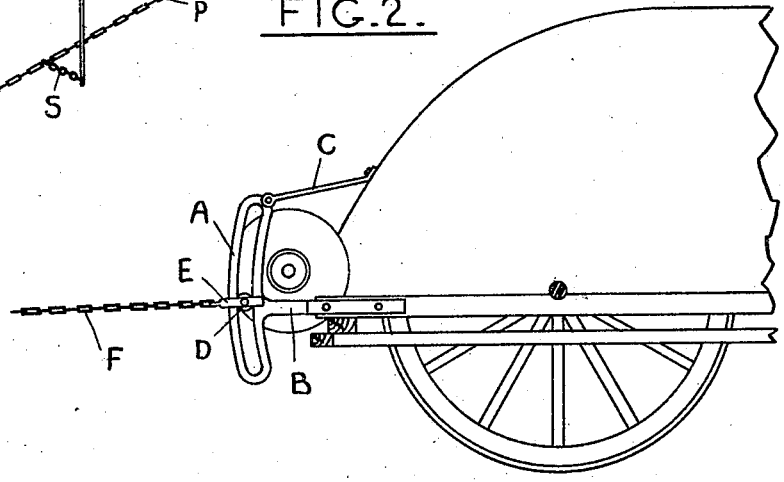
WITNESSES:
W. M. Avery
C. R. Ferguson
INVENTOR
Jabez Tilly
BY Munn & Co
ATTORNEYS

UNITED STATES PATENT OFFICE.

JABEZ TILLY, OF KILKERRAN, SOUTH AUSTRALIA, AUSTRALIA.

DRAFT-GEAR FOR AGRICULTURAL MACHINES.

No. 844,214.  Specification of Letters Patent.  Patented Feb. 12, 1907.

Application filed September 8, 1906. Serial No. 333,783.

*To all whom it may concern:*

Be it known that I, JABEZ TILLY, farmer, a subject of the King of Great Britain and Ireland, resident of Ladysmith, Kilkerran, State of South Australia, Commonwealth of Australia, have invented a certain new and useful Improved Draft-Gear for Strippers and Stripper Harvesting Machines and Similar Agricultural Machines, of which the following is a specification.

This invention has been designed especially to lessen the side draft of a stripper or stripper harvesting-machine, thereby enabling a greater number of horses to be attached abreast without walking in the crop. It may be applied also to any other agricultural machine having a body which is oscillated upon the main axle and draft attached to a platform at one side of the oscillating body.

My invention consists in improved draft attachments or connections and comprises an arc-shaped loop attached to the near side of the machine-body toward the front, carrying a roller and shackle attached by a suitable connection to one end of the hinder of two draft-bars, suitably connected to one another and to the platform of the machine.

In order that my invention may be clearly understood, I will describe the same with reference to the accompanying drawings, in which so much only of the machine is shown as is necessary to clearly illustrate my invention.

Figure 1 is a plan view indicating in outline only the general shape of the forward portion of an ordinary stripper. Fig. 2 is a side view which shows the oscillatable body only of the machine with the arc-shaped loop and the roller-gear. The platform and swings are removed.

This device may be constructed of any desired strength and the relative lengths of the swings and connections adjusted according to the size of the machine upon which it is to be used.

A is an arc-shaped loop attached by means of its stem B to the near side of the machine-body, preferably to the bottom beam of the machine, as shown. The arc-shaped portions of the loop are concentric with the axle of the machine. The top of the arc-shaped loop is connected by a stay C to some convenient part of the machine.

Within the arc-shaped loop is a roller D (which cannot be seen in Fig. 1) with a shackle E, which shackle extends across the front and rear members of the loop, its front end having an eye whereby it is connected by a chain F to the off end of the rear draft-bar H. The stem B has an outward set, so that the roller and shackle may move up and down the loop clear of the machine-cheek. The near end of the rear draft-bar H is connected by a clip J to a beam K, extending forward and outward from the near side of the platform. It rests near its other end upon a beam L, projecting out from the off side of the platform. The front draft-bar M is connected at its off end by means of a clip N to the rear draft-bar H. The point of attachment is varied as desired. The near end of the front draft-bar M is connected by a chain P to the rear of the near side of the platform. Both of the draft-bars have a number of holes, so that the position of the several attachments may be altered to adjust the draft.

Near the front of the platform on its near side is an outrigger-beam R, hung on a vertical pivot having at its outer end a short chain S, which supports the main chain P and also the near end of the front draft bar when turning. The vertical pivot allows the beam R to fold backward toward the platform when the team is swinging round at the end of the field.

Having now fully described and ascertained my said invention and the manner in which it is to be performed, I declare that what I claim is—

1. Improved draft-gear, comprising an arc-shaped loop attached to the near side of the machine-body toward the front and carrying a roller and shackle attached by a suitable connection to the off end of the rear draft-bar, the near end of such draft-bar being connected to a beam extending forward and outward from the near side of the machine-platform, such rear draft-bar being connected by a clip to the off end of a front draft-bar the near end of which is connected by a chain to the rear of the near side of the platform, substantially as described and for the purpose set forth.

2. Improved draft-gear, comprising an arc-shaped loop attached to the near side of the machine-body toward the front and carrying a roller and shackle, in combination with front and rear draft-bars and suitable connections, such connections comprising a chain connection between the front of the shackle and the off end of the rear draft-bar, a clip connection between the near end of the rear draft-bar and a beam extending forward and outward from the near side of the machine-platform, a clip connection between the rear draft-bar and the off end of the front draft-bar, and a chain connection between the near end of the front draft-bar and the rear of the near side of the platform, substantially as described.

3. In a draft-gear, an arc-shaped loop attached to the near side of the machine-body toward the front, preferably to the bottom beam of the machine, and a roller and shackle carried by such loop the front end of the shackle being connected to a draft-bar the other end of which is connected to the machine-platform, substantially as described and for the purpose set forth.

4. In a draft-gear of the kind described, an outrigger-beam hung on a vertical pivot near the front of the near side of the platform, and a short chain or connection between the outer end of the beam and the main chain connecting the off end of the front draft-bar to the rear of the platform, substantially as described and for the purpose set forth.

In testimony that I claim the foregoing as my invention I have signed my name, in the presence of two subscribing witnesses, this 31st day of July, 1906.

JABEZ TILLY.

Witnesses:
 ARTHUR GORE COLLISON,
 LESLIE HERBERT BROADBENT.